United States Patent
Lee et al.

(10) Patent No.: US 10,448,429 B2
(45) Date of Patent: Oct. 15, 2019

(54) METHOD FOR PERFORMING, BY TERMINAL, RANDOM ACCESS PROCEDURE OVER NETWORK IN WHICH MULTIPLE COMMUNICATION SYSTEMS INTERWORK, AND APPARATUS THEREFOR

(71) Applicant: LG ELECTRONICS INC., Seoul (KR)

(72) Inventors: Eunjong Lee, Seoul (KR); Heejeong Cho, Seoul (KR); Jaehoon Chung, Seoul (KR); Genebeck Hahn, Seoul (KR); Hyeyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/103,807

(22) PCT Filed: Dec. 11, 2014

(86) PCT No.: PCT/KR2014/012198
§ 371 (c)(1),
(2) Date: Jun. 10, 2016

(87) PCT Pub. No.: WO2015/088264
PCT Pub. Date: Jun. 18, 2015

(65) Prior Publication Data
US 2016/0323916 A1     Nov. 3, 2016

Related U.S. Application Data

(60) Provisional application No. 61/914,932, filed on Dec. 11, 2013.

(51) Int. Cl.
*H04W 74/08*     (2009.01)
*H04W 76/10*     (2018.01)
(Continued)

(52) U.S. Cl.
CPC ....... *H04W 74/0833* (2013.01); *H04W 48/17* (2013.01); *H04W 72/0413* (2013.01);
(Continued)

(58) Field of Classification Search
CPC ..... H04W 48/17; H04W 74/08; H04W 76/02; H04W 72/0413; H04W 74/0833; H04W 76/046
(Continued)

(56) References Cited

U.S. PATENT DOCUMENTS

2006/0245408 A1    11/2006   Lee et al.
2009/0190550 A1*    7/2009   Giustina ............. H04L 12/5692
                                                            370/331
(Continued)

FOREIGN PATENT DOCUMENTS

WO    2013/009111    1/2013
WO    2013/089526    6/2013

OTHER PUBLICATIONS

PCT International Application No. PCT/KR2014/012198, Written Opinion of the International Searching Authority dated Apr. 13, 2015, 20 pages.

*Primary Examiner* — Huy D Vu
*Assistant Examiner* — Nizam U Ahmed
(74) *Attorney, Agent, or Firm* — Lee Hong Degerman Kang Waimey

(57) ABSTRACT

The method for performing a random access procedure by a user equipment in a network in which a plurality of communication systems interwork may comprise: establishing an association with an access point (AP) of a neighboring wireless LAN communication system if it is impossible to perform a direct uplink transmission to a cellular communication system of the plurality of communication systems or that the UE is located in an area where direct uplink
(Continued)

transmission is not possible; transmitting, to the AP, a first message including a random access preamble sequence; receiving a second message from a eNode B of the cellular communication system in response to the first message; transmitting, to the AP, a third message including the received second message and a radio resource control (RRC) connection request; and receiving, from the eNode B, a fourth message related to an RRC connection setup in response to the third message.

6 Claims, 14 Drawing Sheets

(51) Int. Cl.
    *H04W 48/00*     (2009.01)
    *H04W 72/04*     (2009.01)
    *H04W 76/18*     (2018.01)
    *H04W 76/27*     (2018.01)
    *H04W 76/16*     (2018.01)

(52) U.S. Cl.
    CPC ........... *H04W 74/08* (2013.01); *H04W 76/10* (2018.02); *H04W 76/18* (2018.02); *H04W 76/16* (2018.02); *H04W 76/27* (2018.02)

(58) Field of Classification Search
    USPC ........................................................ 370/329
    See application file for complete search history.

(56) References Cited

U.S. PATENT DOCUMENTS

| | | | |
|---|---|---|---|
| 2011/0222523 A1 | 9/2011 | Fu et al. | |
| 2013/0029639 A1* | 1/2013 | Lee ..................... | H04W 12/06 455/411 |
| 2013/0065585 A1 | 3/2013 | Pelletier et al. | |
| 2013/0088983 A1* | 4/2013 | Pragada ................ | H04W 16/14 370/252 |
| 2013/0223235 A1* | 8/2013 | Hu ........................ | H04W 36/04 370/242 |
| 2014/0029586 A1* | 1/2014 | Loehr ............... | H04W 56/0005 370/336 |
| 2014/0141779 A1* | 5/2014 | Yuk ...................... | H04W 56/00 455/434 |
| 2015/0237591 A1* | 8/2015 | Shukair ............ | H04W 56/0045 370/329 |
| 2016/0249384 A1* | 8/2016 | Di Girolamo .... | H04W 74/0808 |

* cited by examiner

METHOD FOR PERFORMING, BY TERMINAL, RANDOM ACCESS PROCEDURE OVER NETWORK IN WHICH MULTIPLE COMMUNICATION SYSTEMS INTERWORK, AND APPARATUS THEREFOR

CROSS-REFERENCE TO RELATED APPLICATIONS

This application is the National Stage filing under 35 U.S.C. 371 of International Application No. PCT/KR2014/012198, filed on Dec. 11, 2014, which claims the benefit of U.S. Provisional Application No. 61/914,932, filed on Dec 11, 2013, the contents of which are all hereby incorporated by reference herein in their entirety.

TECHNICAL FIELD

The present invention relates to a wireless communication, and more particularly, to a method for a user equipment to perform a random access procedure in a network in which a plurality of communication systems interwork and an apparatus therefor.

BACKGROUND ART

Wireless communication systems may include a multi-RAT UE having capability to access two or more radio access technologies (RATs) or communication systems. To access a specific RAT, connection to the specific RAT is established on the basis of a UE request and transmission/reception of data is performed. However, a multi-RAT UE cannot simultaneously access multiple RATs even if the multi-RAT UE has capability to access two or more RATs. That is, the multi-RAT UE cannot simultaneously transmit and receive data through different RATs even if the UE has multi-RAT capability.

Since the conventional multi-RAT scheme does not require interworking between a wireless LAN and a cellular network, system efficiency thereof is low. In addition, the conventional multi-RAT scheme supports only flow mobility/IP-flow mapping at a network level without control at a radio level even if a UE can simultaneously access multiple RATs, thereby enabling simultaneous access to multiple RATs. For this reason, the conventional scheme has been performed on the basis of a request of the UE without requiring control connection between an AP and a cellular network.

Yet, since the related art is hard to identify a precise situation of a network and performs UE-oriented RAT selection, there is a limit in increasing overall efficiency of the network. In particular, if a user equipment (UE) is unable to perform uplink transmission or downlink reception to a specific communication system among a plurality of communication systems or a UE is located at an area where the uplink transmission or the downlink reception is not available, it is necessary to change a method for the UE to perform initial attach. However, a study on the method has not been performed yet.

DISCLOSURE OF THE INVENTION

Technical Tasks

A technical task of the present invention is to provide a method for a UE to perform a random access procedure in a network in which a plurality of communication systems interwork according to one embodiment of the present invention.

Another technical task of the present invention is to provide a method for a UE to perform a random access procedure in a network in which a plurality of communication systems interwork according to a different embodiment of the present invention.

Another technical task of the present invention is to provide a UE that performs a random access procedure in a network in which a plurality of communication systems interwork according to one embodiment of the present invention.

The other technical task of the present invention is to provide a UE that performs a random access procedure in a network in which a plurality of communication systems interwork according to a different embodiment of the present invention.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing a random access procedure by a user equipment (UE) in a network in which a plurality of communication systems interwork, includes the steps of, if it is impossible to perform a direct uplink transmission to a cellular communication system among a plurality of the communication systems or if the UE recognizes that the UE is located at an area where the direct uplink transmission is impossible, establishing an association with an AP (access point) of a neighboring wireless LAN communication system, transmitting a first message including a random access preamble sequence to the AP, receiving a second message from an eNode B (eNB) of the cellular communication system in response to the first message, transmitting a third message including the received second message and an RRC (radio resource control) connection request to the AP, and receiving a fourth message related to an RRC connection setup from the eNB in response to the third message. In this case, the second message includes a temporary C-RNTI (cell-radio network temporary identifier) and uplink resource allocation information and the uplink allocation information may include information in an uplink resource to be used by the AP. The fourth message includes a C-RNTI (cell-radio network temporary identifier) assigned for the UE and the method may further include the step of receiving data from the eNB using the C-RNTI after receiving the fourth message.

To further achieve these and other advantages and in accordance with the purpose of the present invention, according to a different embodiment, a method of performing a random access procedure by a user equipment (UE) in a network in which a plurality of communication systems interwork, includes the steps of, if it is impossible to perform a direct downlink reception to a cellular communication system among a plurality of the communication systems or if the UE recognizes that the UE is located at an area where the direct downlink reception is impossible, establishing an association with an AP (access point) of a neighboring wireless LAN communication system, receiving random preamble set information related to the AP from the AP, transmitting a first message including a random access preamble sequence randomly selected from the random preamble set information to an eNode B (eNB) of the cellular communication system, and receiving a second message from the AP in response to the first message. In this case, the selected random access preamble sequence is configured to be distinguished from a random access preamble sequence of a different AP by the eNB. The second message may include a temporary C-RNTI (cell-radio network temporary identifier), uplink resource allocation information and timing advance (TA) information.

To further achieve these and other advantages and in accordance with the purpose of the present invention, according to one embodiment, a user equipment (UE) for performing a random access procedure in a network in which a plurality of communication systems interwork includes, if it is impossible to perform a direct uplink transmission to a cellular communication system among a plurality of the communication systems or if the UE recognizes that the UE is located at an area where the direct uplink transmission is impossible, a processor configured to establish an association with an AP (access point) of a neighboring wireless LAN communication system, a transmitter configured to transmit a first message including a random access preamble sequence to the AP, and a receiver configured to receive a second message from an eNode B (eNB) of the cellular communication system in response to the first message. In this case, the transmitter is configured to transmit a third message including the received second message and an RRC (radio resource control) connection request to the AP and the receiver is configured to receive a fourth message related to an RRC connection setup from the eNB in response to the third message. The second message includes a temporary C-RNTI (cell-radio network temporary identifier) and uplink resource allocation information and the uplink allocation information may include information of an uplink resource to be used by the AP.

Advantageous Effects

According to the present invention, when a UE capable of transmitting and receiving data to/from a cellular network and a Wi-Fi network at the same time attempts a cellular initial access at a location where DL or UL link use of the cellular network is impossible due to a location and a network situation, it is able to enable the UE to perform the cellular initial access via the adjacent Wi-Fi network. In particular, according to a technology of the present invention, when a UE recognizes that it is impossible to use a DL or UL link of a cellular network, it is able to enable the UE to perform a random access procedure and an initial access procedure via an efficient cellular DL or UL link using a Wi-Fi network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
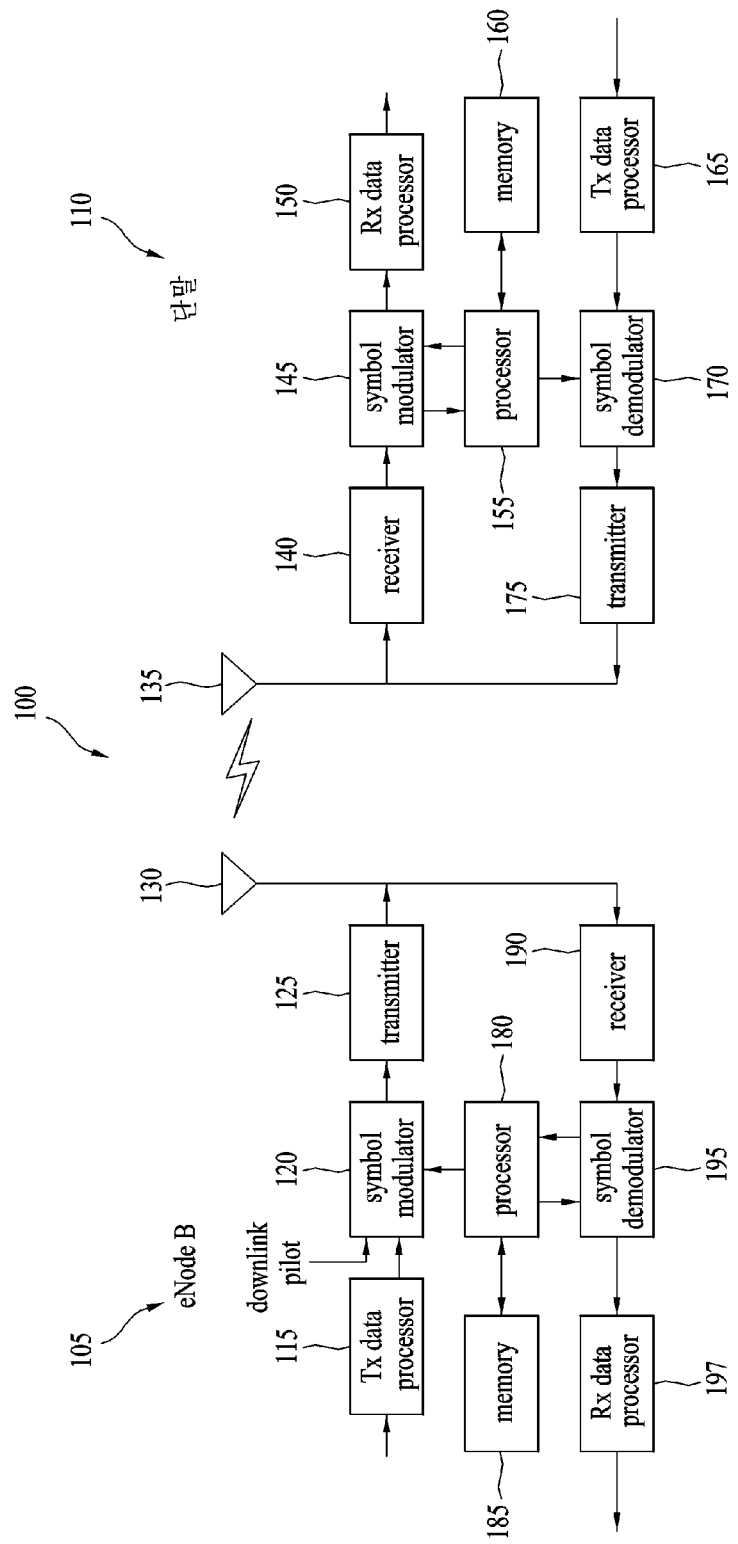
FIG. 1 is a block diagram for configurations of an eNode B 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

A brief description will be given of multi-RAT UE based WLAN-cellular interworking. A UE having capability to access two or more radio access technologies (RATs) is referred to as a multi-RAT UE and is abbreviated to UE in the specification. To access specific RAT, connection to the specific RAT is established on the basis of a UE request and data transmission/reception is performed. Information can be exchanged between heterogeneous networks using an ANDSF server.

Figure 2:
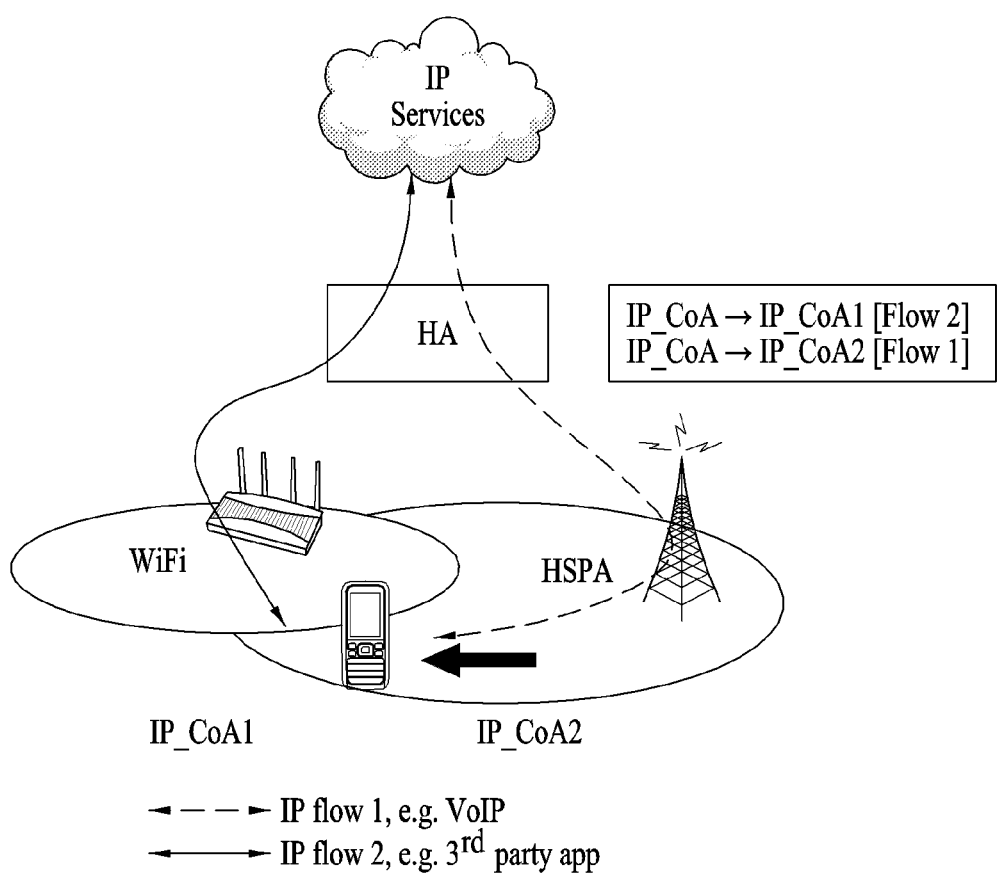
FIG. 2 is an exemplary diagram for explaining IP flow-based Wi-Fi mobility.

FIG. 2 is a view for explaining IP flow based Wi-Fi mobility.

IFOM (IP Flow Mobility): 3GPP (Rel-10) describes 3G/Wi-Fi seamless offload and provides IP flow based WLAN offloading on the basis of DSMIPv6 and a solution through which DSMIPv6 (Dual Stack Mobile IPv6) UEs and networks simultaneously support IPv4 and IPv6. As IPv6 spreads due to diversification of mobile communication networks and mobility support emerges as a core technology, even IPv4 networks adopt DSMIPv6 since mobility support is needed. Furthermore, client-based MIP technology through which a UE detects movement thereof and notifies an agent of the detected result is provided. An HA is an agent that manages mobile node mobility and includes a flow binding table and a binding cache table. When PMIPv6 is used, IP flow mobility (IFOM) uses only DSMIPv6 due to a technical problem that it is difficult to perform IP flow based management.

MAPCON (Multi Access PDN Connectivity): this has simultaneous multiple PDN connectivity for different APNs and can use PMIPv6, GTP and DSMIPv6 as protocol independent technology. All data flows being transmitted through one PDN are moved.

A description will be given of a network structure in which multiple communication systems interwork.

Figure 3:
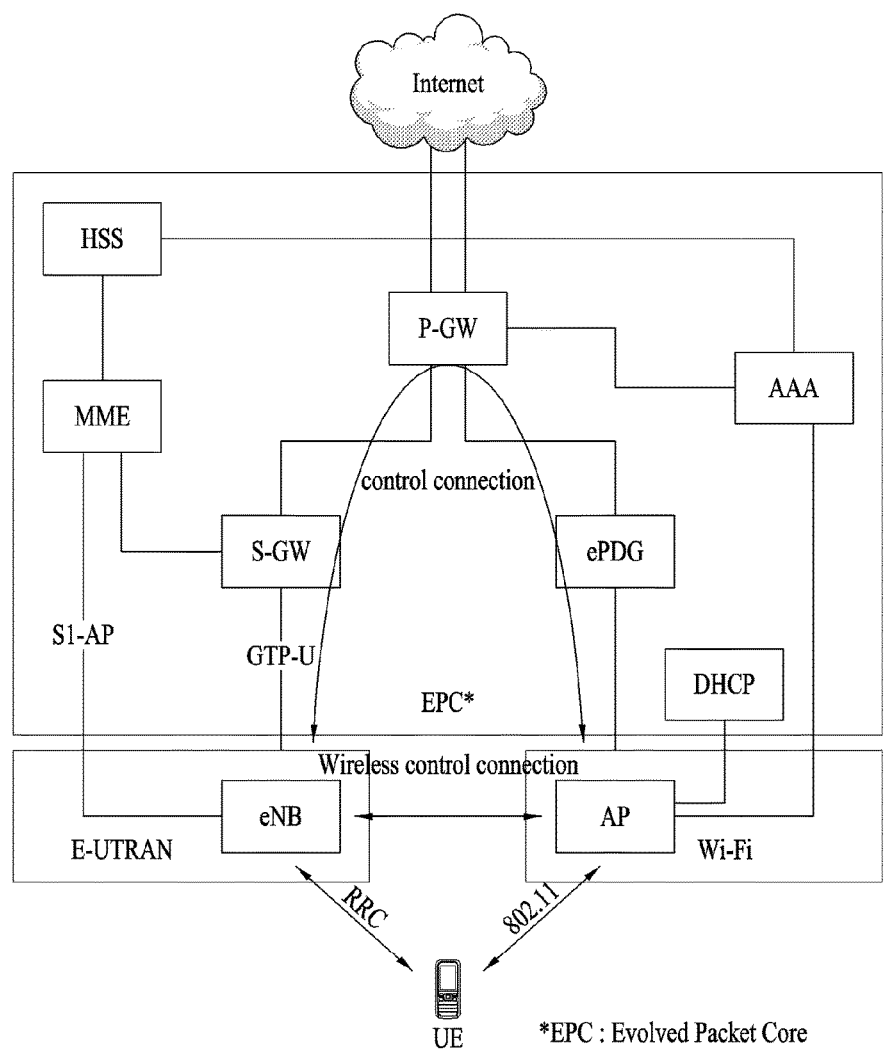
FIG. 3 is an exemplary diagram of a network structure for explaining an interworking structure of a first communication system (i.e., cellular communication system) and a second communication system (wireless LAN communication system)

FIG. 3 illustrates a network architecture for explaining an interworking structure of a first communication system (i.e. cellular communication system) and a second communication system (WLAN communication system). The present invention exemplifies an LTE system, one of cellular communication systems, corresponding to the first communication system and a Wi-Fi system, one of WLAN communication systems, corresponding to the second communication system.

In the network architecture shown in FIG. 3, backhaul control connection or wireless control connection between an AP and a BS may be established through a backbone network (e.g. P-GW or EPC (Evolved Packet Core)). For peak throughput and data traffic offloading, a UE can simultaneously support the first communication system (or first communication network) using a first wireless communication scheme and the second communication system (or second communication network) using a second wireless communication scheme through interworking between multiple communication networks. Here, the first communication network or the first communication system may be referred to as a primary network or a primary system, and the second communication network or the second communication system may be referred to as a secondary network or a secondary system. For example, the UE can be configured to simultaneously support LTE (or LTE-A) and Wi-Fi (short-range communication system such as WLAN/802.11). Such UE is referred to as a multi-system capability UE in the specification.

In the network architecture shown in FIG. 3, the primary system has wider coverage and may be a network for transmitting control information. An example of the primary system is a WiMAX or LTE (LTE-A) system. The secondary system is a network having narrow coverage and may be a system for data transmission. For example, the secondary network can be a WLAN system such as WLAN or Wi-Fi.

The present invention assumes the following.

The present invention will be described on the assumption of the following.

It is assumed that an entity that administrates interworking is present in a cellular network and an interworking function is implemented in the following three entities.

eNB reuse an existing entity.

MME (Mobility Management Entity)—reuse an existing entity.

IWME (Interworking Management Entity)—define a new entity.

The interworking function is associated with an interworking-related procedure that can be generated between the eNB and UE or between the eNB and AP, and an entity that administrates interworking stores/manages AP information. The eNB/MME/IWME store/manage information of APs under the coverage thereof.

It is assumed that connection between an access point (AP) of the secondary system (e.g. Wi-Fi) and the eNB, which is an access point of the primary system (e.g. cellular communication system such as LTE or WiMAX), is established on a radio link. In the present invention, an AP having a radio interface with an eNB is referred to as an eAP. That is, the eAP needs to support not only 802.11 MAC/PHY but also LTE protocol stack or WiMAX protocol stack for communication with the eNB and can serve as a UE to communicate with the eNB.

Figure 4:
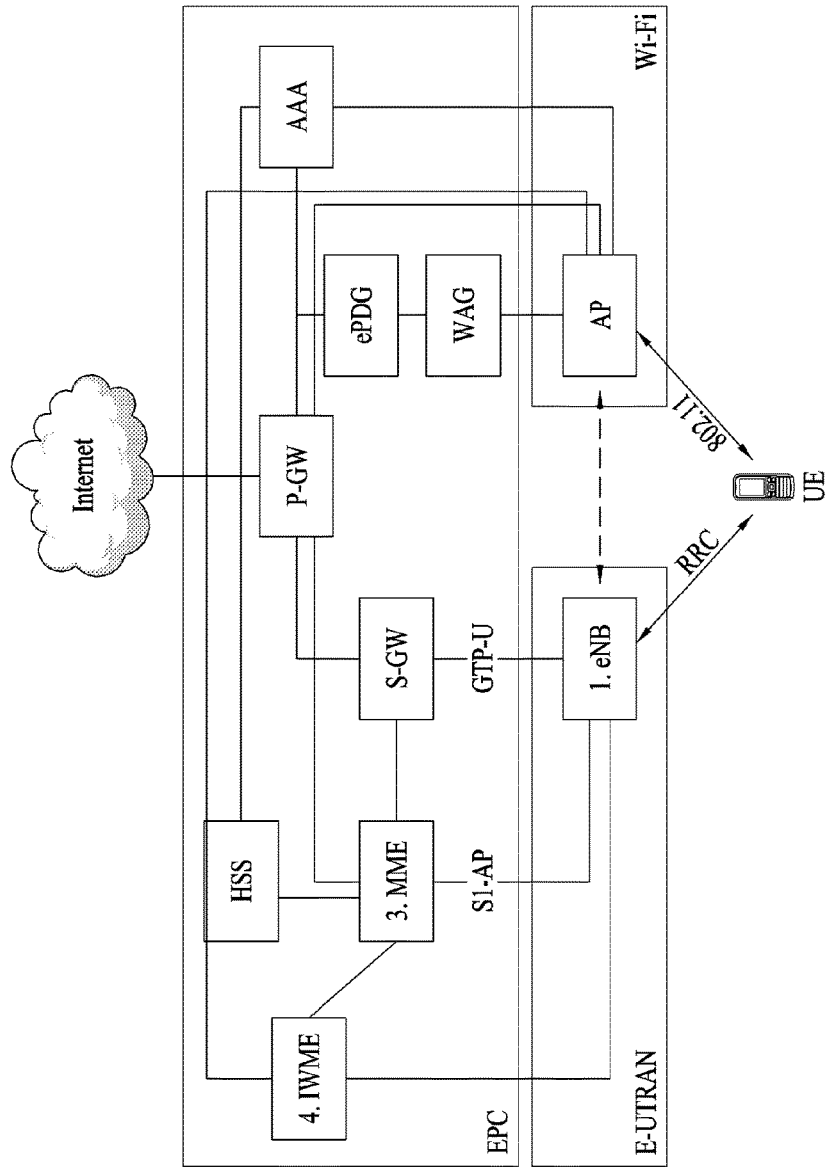
FIG. 4 is an exemplary diagram for a WiFi-cellular interworking network structure according to the present invention.

FIG. 4 illustrates a network structure of Wi-Fi-cellular interworking according to the present invention.

According to the present invention, a cellular network can manage AP information according to the following four methods to enable a dual-mode or multi-RAT UE to efficiently use a Wi-Fi-cellular convergence network in an environment in which UEs capable of simultaneously transmitting and receiving signals through Wi-Fi and cellular networks are present.

Method 1: an air interface between an eNB and an AP is used.

The eNB controls the AP similarly to a normal UE using wireless control connection with the AP.

Method 2: a backhaul interface between the eNB and the AP is used.

The eNB controls the AP using wireless control connection with the AP.

Method 3: a control interface between an MME and the AP is used.

The AP is controlled using control connection between the MME and the AP (i.e. secondary system).

Method 4: a control interface between an IWME and the AP is used.

The AP is controlled using control connection between the IWME and the AP (i.e. secondary system).

Figure 5:
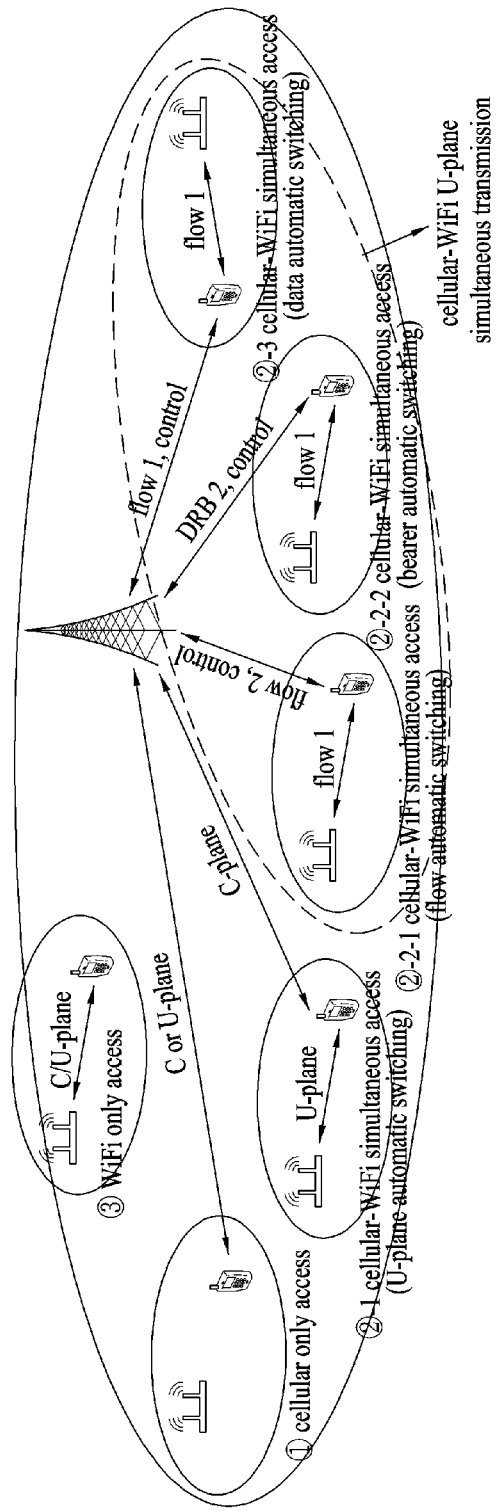
FIG. 5 is an exemplary diagram for explaining a scenario of a WiFi-Cellular convergence network.

FIG. 5 is a view for explaining Wi-Fi-cellular convergence network scenarios.

Scenario ① shown in FIG. 5 is a scenario in which a UE accesses the cellular network only. This scenario requires definition of technology for automatic Wi-Fi switching/simultaneous transmission while the UE accesses the cellular network only. AP information management for interworking is performed at the network level (cellular-Wi-Fi), whereas Wi-Fi discovery and Wi-Fi network access are performed at the device level (cellular-device-Wi-Fi). Scenarios ②-1, ②-2-1, ②-2-2 and ②-3 respectively represent automatic Wi-Fi switching of user plane (U-plane), automatic Wi-Fi switching of a flow, automatic Wi-Fi switching of a bearer and automatic Wi-Fi switching of data between cellular-Wi-Fi. According to ②-1, all data are transmitted through only Wi-Fi upon automatic cellular-Wi-Fi U-plane switching. According to scenarios ②-2 and ②-3, data can be simultaneously transmitted through Wi-Fi and cellular networks using bandwidth segregation or aggregation upon switching of cellular-Wi-Fi U-plane to simultaneous transmission. Here, bandwidth segregation refers to automatic switching per flow (service/IP flow) such as ②-2 and enables different flows to be transmitted through different RATs. In scenario ②-2, automatic switching per flow may be performed for one or more services/IP flows. That is, automatic switching per flow may be flow-based switching (②-2-1) or switching per data radio (or EPS) bearer (②-2-2). Bandwidth aggregation enables a flow to be transmitted through different RATs on a data basis, as shown in ②-3.

After automatic Wi-Fi switching as in scenario ②, Wi-Fi based cellular link control can be performed as in scenario ③. Cellular link related paging or information on control with respect to radio link failure (RLF) can be received through a Wi-Fi link.

Since the conventional inter-RAT is designed on the basis of UE request, interworking between a WLAN and a cellular network is not needed, a specific network server manages WLAN information and inter-RAT handover is enabled at the request of a UE. In addition, the UE is enabled to simultaneously access multiple RATs by supporting only flow mobility/IP-flow mapping at the network level without control at the radio level. For this reason, the conventional technology does not require control connection between an AP and the cellular network and enables access to multiple RATs on the basis of UE request. Such conventional technology cannot recognize correct network state and has a limitation on enhancement of overall network efficiency by selecting RAT based on the UE.

To improve QoS of UEs and overall network efficiency using multi-RAT, it is necessary to provide network-based tightly-coupled Multi-RAT management rather than UE-based multi-RAT. Here, more efficient and faster inter-RAT interworking is required since direct control connection is established between different RATs at the network level, and UE data needs to be transmitted through the best RAT by the corresponding interworking entity.

Owing to performance enhancement (e.g. 3D beamforming) or location restrictions (e.g. cell edge, indoor or the like) of a BS, even when a UE located in a certain area receives a downlink (DL) signal with sufficient intensity from the cellular network, uplink (UL) transmission may be difficult to perform due to UE capability restriction. In this case, the UE needs to recognize that only DL reception can be performed in the area, and thus it is necessary to minimize execution of an unnecessary RACH (Random Access Channel) procedure or initial access procedure. That is, the UE needs to use only downlink link in the cellular system.

As the number of small cells increases and UE performance is enhanced, the UE can transmit UL signals to the BS but the BS may have difficulty in DL reception due to insufficient transmission power or performance of the BS. In this case, the UE needs to recognize that the corresponding area is an area in which only UL transmission can be performed and to receive cellular DL information through Wi-Fi. That is, the UE needs to use only uplink in the cellular system. However, methods and procedures for communication when a cellular network supports only DL or UL have not been proposed.

Figure 6:
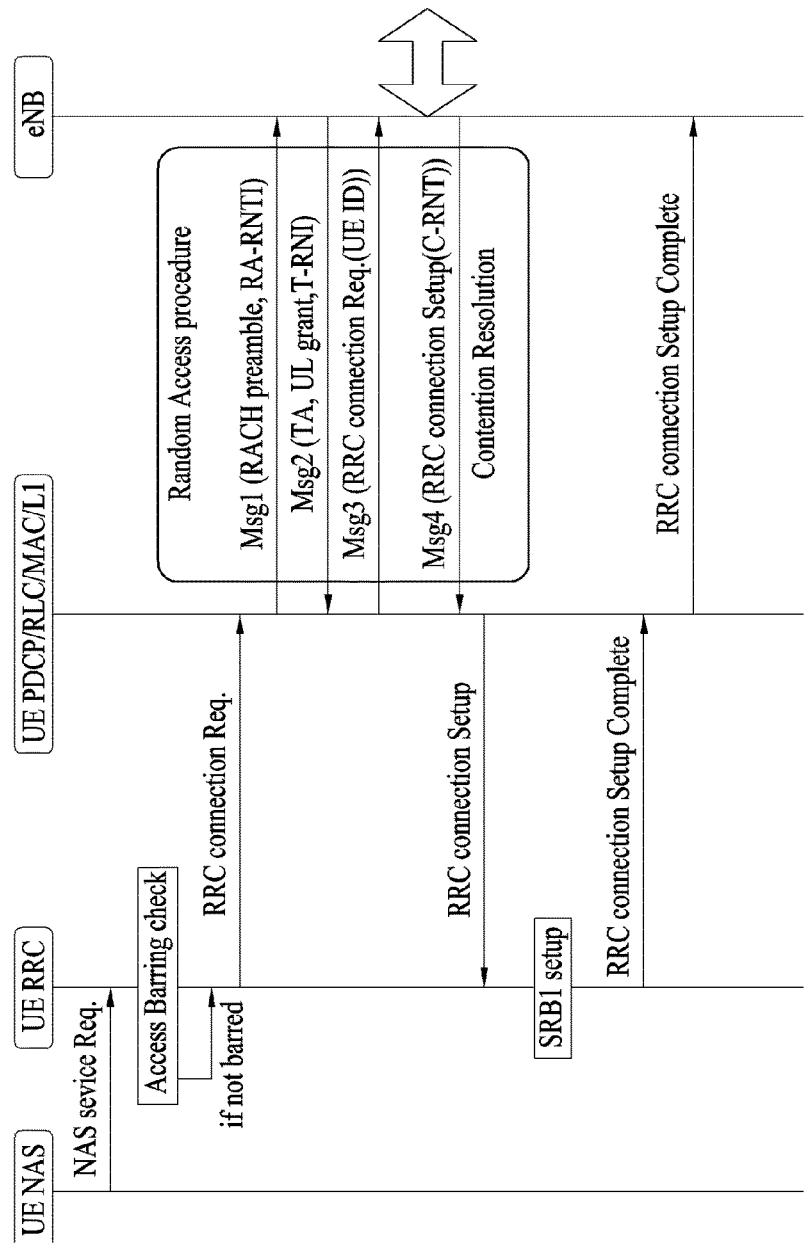
FIG. 6 is an exemplary diagram for explaining an RRC connection establishment procedure in 3GPP LTE system.

FIG. 6 is an exemplary diagram for explaining an RRC connection establishment procedure in 3GPP LTE system.

Referring to FIG. 6, a NAS service request message is delivered to a UE RRC layer from a UE NAS layer. Having received the NAS service request message, the UE RRC layer checks whether or not an access is restricted (access baring check). If there is no access restriction, the UE RRC layer delivers an RRC connection request message to a UE PDCP/RLC/MAC/L1 layer. Subsequently, a random access procedure is performed between the UE PDCP/RLC/MAC/L1 layer and an eNode B (eNB). In the following, a random access procedure is explained.

A random access procedure has characteristics described in the following. A random access procedure corresponds to a common procedure for both a FDD system and a TDD system. A random access procedure corresponds to a single procedure irrespective of the number of serving cells and a size of a cell, when carrier aggregation (CA) is set.

A random access procedure performs events shown in Table 1 in the following related to a primary cell (Pcell).

---

Initial access from RRC_IDLE;
RRC Connection Re-establishment procedure;
Handover;
DL data arrival during RRC_CONNECTED requiring random access procedure;
E.g. when UL synchronisation status is "non-synchronised";
UL data arrival during RRC_CONNECTED requiring random access procedure;
E.g. when UL synchronisation status is "non-synchronised" or there are no PUCCH resources for SR available.
For positioning purpose during RRC_CONNECTED requiring random access procedure;
E.g. when timing advance is needed for UE positioning;

---

A random access procedure is also performed on an Scell to configure time alignment for a corresponding sTAG (time advance group of an Scell). And, a random access procedure operates with two characteristics different from each other. One is a contention-based random access procedure (e.g., top 5 events of Table 1) and another one is a non-contention-based random access procedure (e.g., applicable to only handover, DL data arrival, positioning and obtaining timing advance alignment for a sTAG).

In general, DL/UL transmission can be performed after a random access procedure. A relay node (RN) supports both a contention-based random access and a non-contention-based random access. When a relay node performs a random access procedure, the random access procedure can be performed depending on a current RN subframe configuration. Yet, it is able to temporarily ignore the RN subframe configuration. The RN subframe configuration can be initialized again when the random access procedure is successfully completed.

FIG. 6 shows a contention-based random access procedure. Referring to FIG. 6, a UE PDCP/RLC/MAC/L1 layer transmits Msg 1 (RACH preamble including RA-RNTI) to an eNB. The eNB transmits Msg 2(timing advance command including initial UL grant and temporary C-RNTI) to the UE PDCP/RLC/MAC/L1 layer in response to the Msg 1. The UE PDCP/RLC/MAC/L1 layer transmits an RRC connection request message including a UE ID (identifier) to the eNB based on the initial UL grant information. The eNB can transmit an RRC connection setup message to the UE PDCP/RLC/MAC/L1 layer. The UE PDCP/RLC/MAC/L1 layer delivers the RRC connection setup message to a UE RRC layer and the UE RRC layer performs SRB1 setup. Subsequently, the UE RRC layer transmits an RRC connection setup complete message to the UE PDCP/RLC/MAC/L1 layer and the UE PDCP/RLC/MAC/L1 layer delivers the RRC connection setup complete message to the eNB.

A UE can obtain a RACH preamble configuration by receiving a system information block 2 (SIB2). The system information block 2 (SIB2) includes a RadioResourceConfiguCommon parameter and the RadioResourceConfiguCommon parameter includes a RACH-ConfigCommonSIB {PRACH-ConfigInfo} parameter and carries information on the RACH preamble configuration. A layer 1 procedure is triggered by the request of transmitting a preamble requested by higher layers. A preamble index, target preamble reception power, a corresponding RA-RNTI (random access-radio network temporary identifier), and a PRACH resource are indicated by higher layers as a part of the request.

Figure 7:
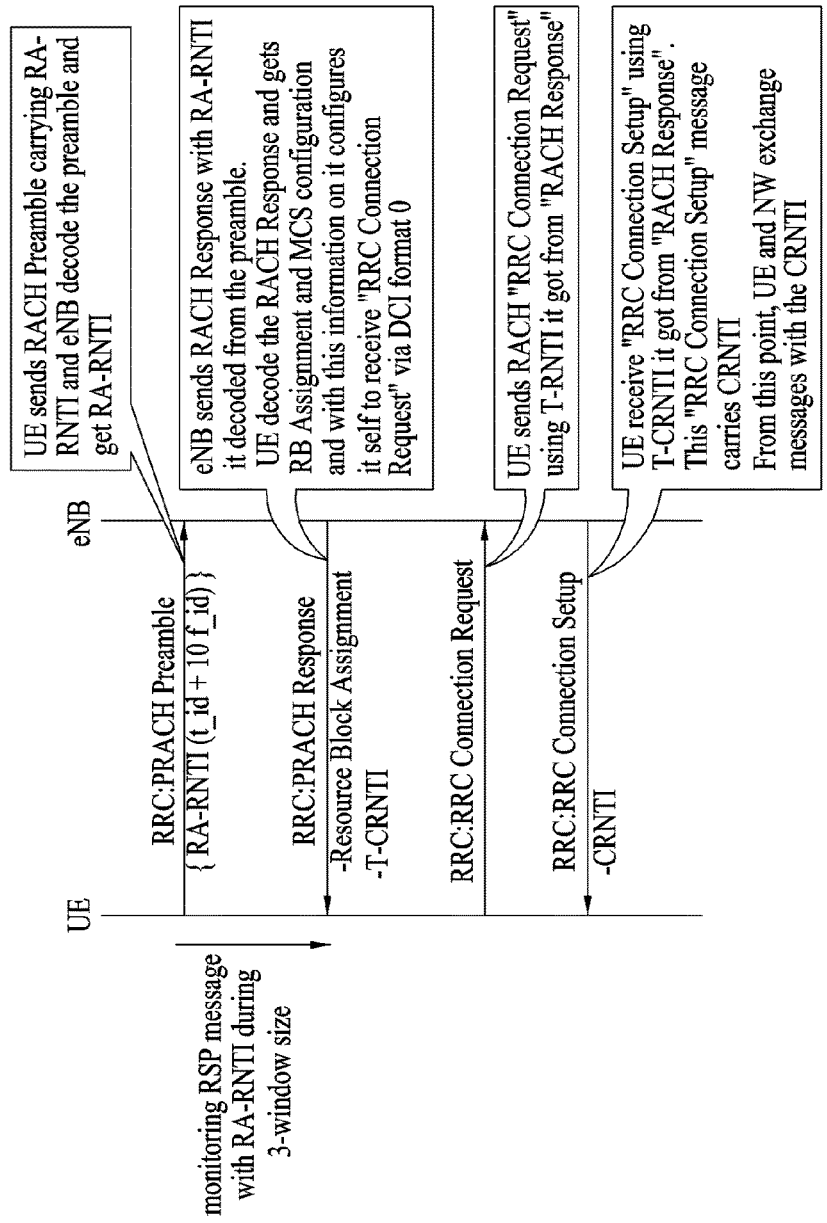
FIG. 7 is a diagram for an example of a contention-based random access procedure in 3GPP LTE system.

FIG. 7 is a diagram for an example of a contention-based random access procedure in 3GPP LTE system.

A user equipment (UE) transmits a PRACH preamble to an eNode B (eNB) and the eNB transmits a PRACH response message including resource block allocation and a temporary RNTI (T-RNTI) (or a temporary C-RNTI) to the UE. The UE transmits an RRC connection request message to the eNB using the T-RNTI which is obtained from the PRACH response message. The eNB can transmit an RRC connection setup message including C-RNTI to the UE in response to the RRC connection request message.

In 3GPP LTE system, a purpose of a random access procedure can be mainly classified into (1) uplink synchronization (timing alignment (RA preamble response)) and (2) RRC connection configuration (message 3, configured via a message 4, C-RNTI assignment). An RRC connection configuration procedure includes an initial UL grant for a message 3 and a temporary C-RNTI for a message 3 and 4.

RACH in DL only cellular (if there is a cellular DL link only)

In case of a UE not including a cellular UL link, it is not necessary for the UE to have a UL grant for UL synchronization and a message 3. Yet, in order to receive DL data via a cellular link, it is necessary to receive allocation of a C-RNTI via an RRC connection configuration. A UE can receive the C-RNTI via a message 4 (RRC connection setup). A legacy eNB obtains RA-RNTI via a random access preamble received from a UE to transmit a response to the UE, transmits an RA preamble response via the RA-RNTI, and transceives an RRC connection REQ/setup message with the eNB via a T-RNTI received via the response. Yet, when it is not necessary for a UE to match UL synchronization, RA preamble transmission may correspond to an unnecessary procedure. And, a UL grant for a message 3 allocated by a cellular network may also correspond to an unnecessary element.

RACH in UL only cellular (if there is a cellular UL link only)

In case of a UE not including a cellular DL link, the UE receives DL system information via Wi-Fi and transmits a RACH preamble via a cellular UL link. In this case, it is necessary for an eNB to recognize that the UE, which has transmitted the RACH preamble, corresponds to a UE incapable of receiving information via a cellular DL link.

In a broadband wireless communication system, when a UE capable of transmitting and receiving data to/from a cellular network and a Wi-Fi network at the same time attempts a cellular initial access at a location where DL or UL link use of the cellular network is impossible due to a location and a network situation, the present invention proposes enabling the UE to perform the cellular initial access via the adjacent Wi-Fi network. In particular, according to a technology of the present invention, when a UE recognizes that it is impossible to use a DL or UL link of a cellular network, the present invention proposes a method of performing a random access procedure and an initial access procedure via a cellular DL or UL link using a Wi-Fi network.

First of all, when a UE recognizes that the UE is located at an area where DL reception from a cellular network is sufficient but UL transmission is difficult, a new initial attachment procedure for enabling the UE to perform an initial attachment procedure appropriate for the aforementioned scenario is proposed.

Figure 8:
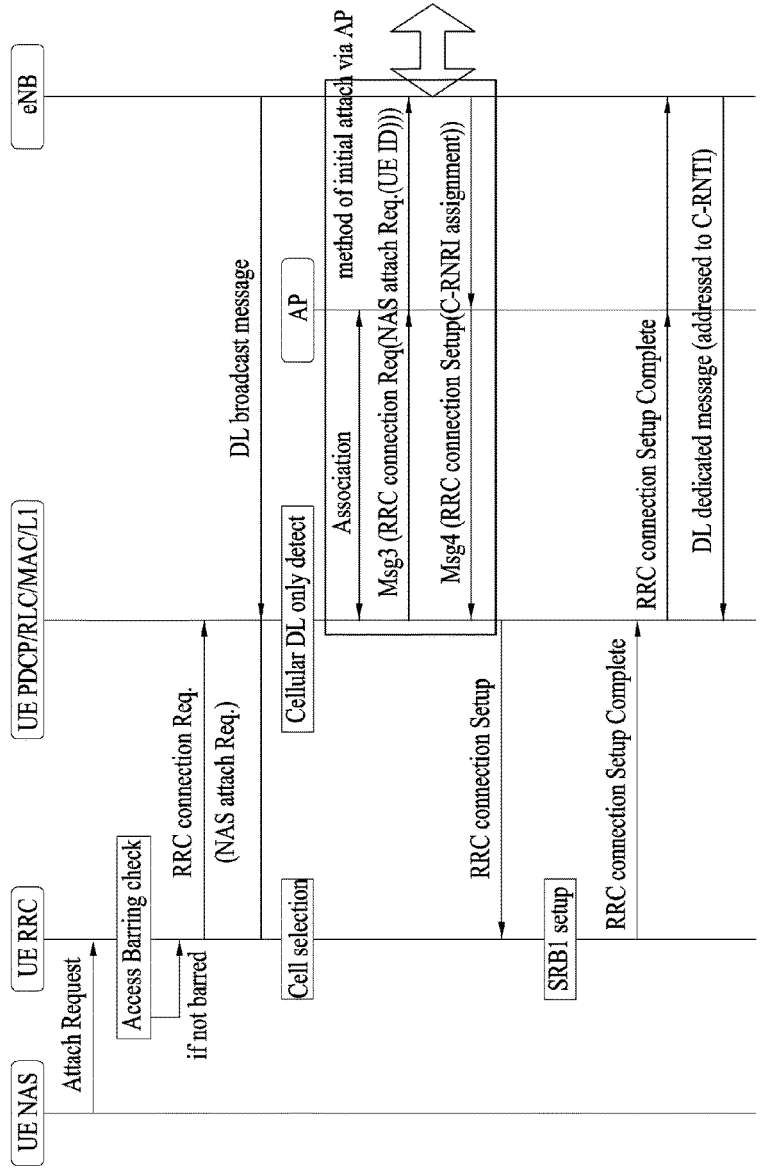
FIG. 8 is an exemplary diagram for an initial attachment procedure performed by a UE according to one embodiment of the present invention when cellular UL transmission is impossible.

Initial Attachment Procedure which is Proposed when UL Transmission to Cellular Network is Impossible FIG. 8 is an exemplary diagram for an initial attachment procedure performed by a UE according to one embodiment of the present invention when cellular UL transmission is impossible.

An embodiment of FIG. 8 corresponds to a method for a UE to receive assignment of a C-RNTI without transmitting an RA (random access) preamble and receiving a random access response.

When cellular UL transmission is impossible, a UE performs all initial attachment procedures via a connected AP. The UE configures an RRC connection with a cellular network and receives assignment of a C-RNTI in a manner of establishing an association with the AP and transceiving an RRC connection Request/Setup/SetupComplete message with the AP. In this case, the UE can transmit a UE ID to an eNB of the cellular network and receive a C-RNTI from the eNB via a reliable AP.

Figure 9:
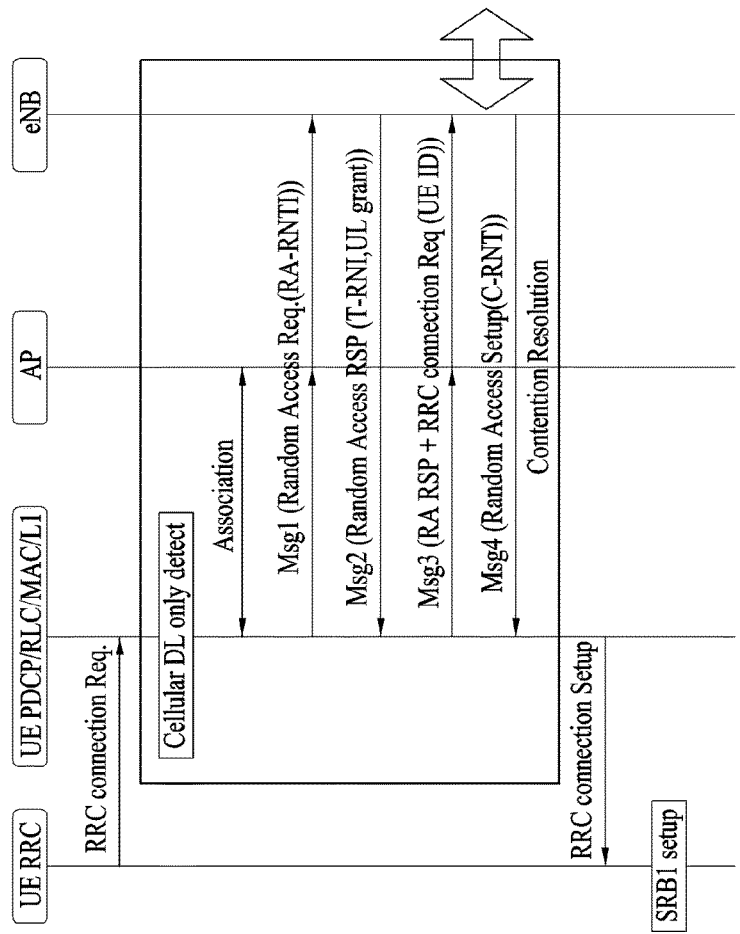
FIG. 9 is an exemplary diagram for an initial attachment procedure performed by a UE according to a different embodiment of the present invention when cellular UL transmission is impossible.

FIG. 9 is an exemplary diagram for an initial attachment procedure performed by a UE according to a different embodiment of the present invention when cellular UL transmission is impossible.

An embodiment of FIG. 9 corresponds to a method for a UE to share an RA-RNTI (random access radio network temporary identity) for an RA preamble response.

Referring to FIG. 9, a UE establishes an association with an AP. Subsequently, the UE transmits a random access request message (including a generated RA-RNTI) (Msg 1) to the AP. The AP delivers the random access request message (Msg 1) to an eNB of a cellular network. The UE can receive a random access response message (Msg 2) which is addressed by an RA-RNTI transmitted from the eNB of the cellular network. The random access response message can include an allocated T-RNTI and a UL grant (uplink resource allocation information). In this case, the UL grant may correspond to a UL grant to be used by the AP instead of the UE. The UE delivers a message (Msg 3) including the random access response message (RA RSP message) received from the eNB and an RRC connection request (including a UE ID) to the AP and the AP delivers the Msg 3 to the eNB. In this case, having received the Msg 3, the AP checks a resource for transmitting an RRC connection request message of the UE via the UL grant included in the random access response message and transmits the RRC connection request message of the UE to the eNB of the cellular network via the resource. In this case, if it fails to transmit the message, it is recognized as a collision occurs. If the RRC connection request of the UE is successfully transmitted, the UE recognizes it as contention is resolved by receiving an RRC connection setup message addressed by a T-RNTI from the eNB within a specific time and may be then able to receive cellular data via a received C-RNTI.

Figure 10:
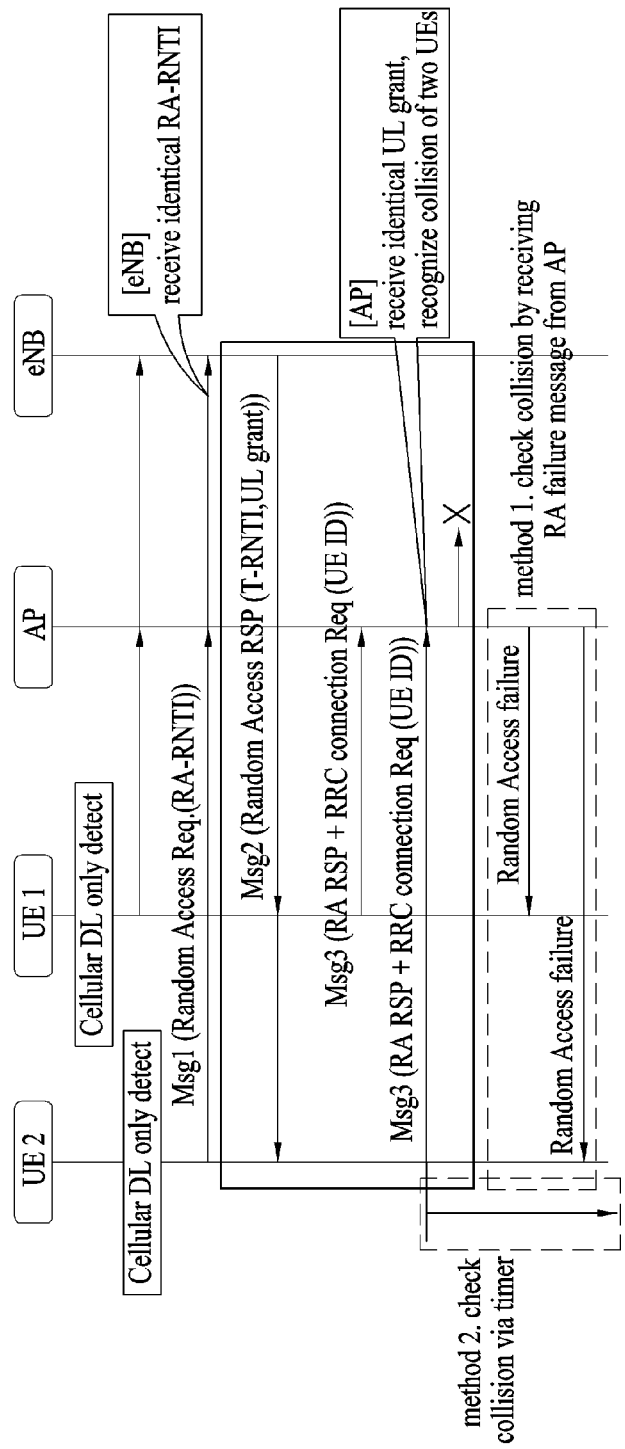
FIG. 10 is an exemplary diagram for an initial attachment procedure performed by a UE related to embodiment of FIG. 9 when random access preambles are collided with each other.

FIG. 10 is an exemplary diagram for an initial attachment procedure performed by a UE related to embodiment of FIG. 9 when random access preambles are collided with each other.

In FIG. 10, assume that UEs (UE 1 and UE 2) are able to perform cellular DL reception but the UEs are unable to perform cellular UL transmission. Two or more UEs (UE 1 and UE 2) can transmit a random access request message to an eNB at the same time by selecting an identical RA-RNTI. The eNB transmits a random access response message including a T-RNTI and a UL grant to the UE 1 and the UE 2, respectively. Subsequently, when the UE 1 and the UE 2 perform an action via a resource indicated by an identical UL grant, a collision occurs. Before a C-RNTI is assigned, it is necessary to make a UE recognize a collision.

To this end, a random access procedure of 4 steps is performed and the random access procedure is defined as a procedure between a UE and an eNB. Yet, the present invention proposes a random access to be performed by an AP and the present invention proposes receiving a help from the AP to detect a collision. In particular, the eNB transmits information on a resource for an msg 3, which is to be transmitted by the AP via a random access response message, to the UEs (UE 1 and UE 2) via a UL grant. Since it is difficult for the UEs (UE 1 and UE 2) to perform cellular UL transmission, each of the UEs (UE 1 and UE 2) transmits a message (Msg 3) including an RRC connection request and a random access response to the AP in response to the random access response message (Msg 2). Then, since the AP receives an identical UL grant from the UEs (UE 1 and UE 2), the AP is able to recognize that there is a random access collision of the UEs (UE 1 and UE 2).

The UE 1 and the UE 2 are able to know that a random access has failed by receiving a message indicating the failure of the random access from the AP. As a different method, when the UE 1 and the UE 2 transmit an msg 3, the UE and the UE 2 operate a prescribed timer. If an RRC connection response message is not received from the AP until the timer expires, the UE and the UE 2 are able to recognize it as a random access has failed.

Initial Attachment Procedure which is Proposed when DL Reception from Cellular Network is Impossible Subsequently, a method for a UE to perform an initial attachment procedure via an adjacent AP is proposed when the UE recognizes that the UE is located at an area where DL reception from a cellular network is difficult. In this case, an operator or an eNB can configure the AP as an AP configured to transmit DL information of the eNB instead of the eNB. The AP can inform the UE that the AP corresponds to an AP supporting cellular DL via a beacon/probe RSP.

(1) RACH Preamble Set for UL Only Cellular UE

In a scenario that a UE corresponds to a UL only cellular UE, if the UE transmits a RACH preamble to an eNB, having received the RACH preamble from the UE, it is necessary for the eNB to recognize that a response message is transmitted via an AP in response to the RACH preamble. Yet, according to a current technology, since it is defined as the eNB makes a response using a link of the eNB all the time, a UE, which is located at an area where cellular UL transmission is available only, is unable to properly receive a response message in response to the RACH preamble.

Figure 11:
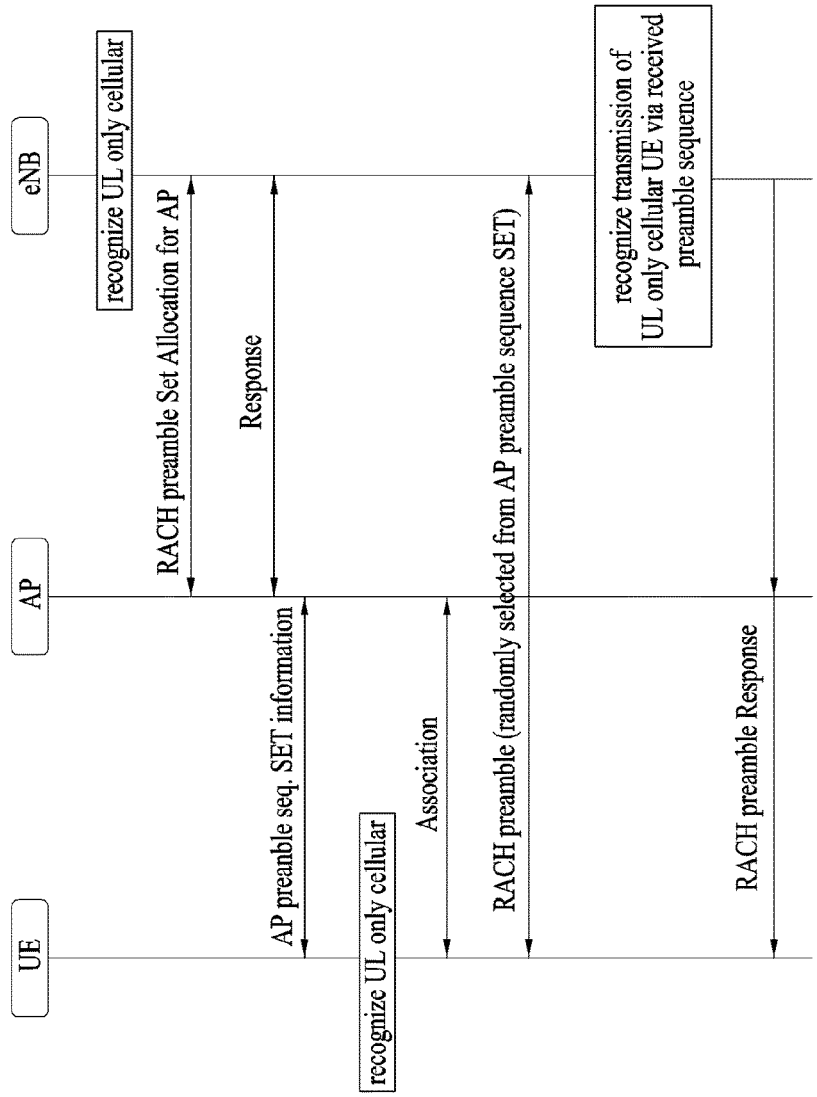
FIG. 11 is an exemplary diagram for an initial attachment procedure which is proposed for a case that a UE is unable to receive cellular DL in a scenario that the UE is located at an area where cellular UL transmission is available only according to one embodiment of the present invention.

FIG. 11 is an exemplary diagram for an initial attachment procedure which is proposed for a case that a UE is unable to receive cellular DL in a scenario that the UE is located at an area where cellular UL transmission is available only according to one embodiment of the present invention.

According to a technology of the present invention, in order to solve the aforementioned problem, an AP, which is installed in the area where cellular UL transmission is available only to support cellular DL reception, can receive allocation of a RACH preamble set (including AP preamble sequence set information) from an eNB, which has recognized that a UE of a cellular network is located at the area where the cellular UL transmission is available only. The AP can transmit information on the allocated RACH preamble set to the UE via a beacon or a multi-RAT related message.

The UE is able to recognize that the UE is located at an area where cellular UL transmission is available only and establish an association with the AP. And, the UE transmits a RACH preamble randomly selected from the received AP preamble sequence set information to the eNB. The eNB checks the RACH preamble received from the UE and may be then able to recognize that the RACH preamble is transmitted from the UE located at the area where cellular UL transmission is available only or the UE capable of performing cellular UL transmission only. The eNB can transmit a RACH preamble response message to the UE in response to the received RACH preamble.

Figure 12:
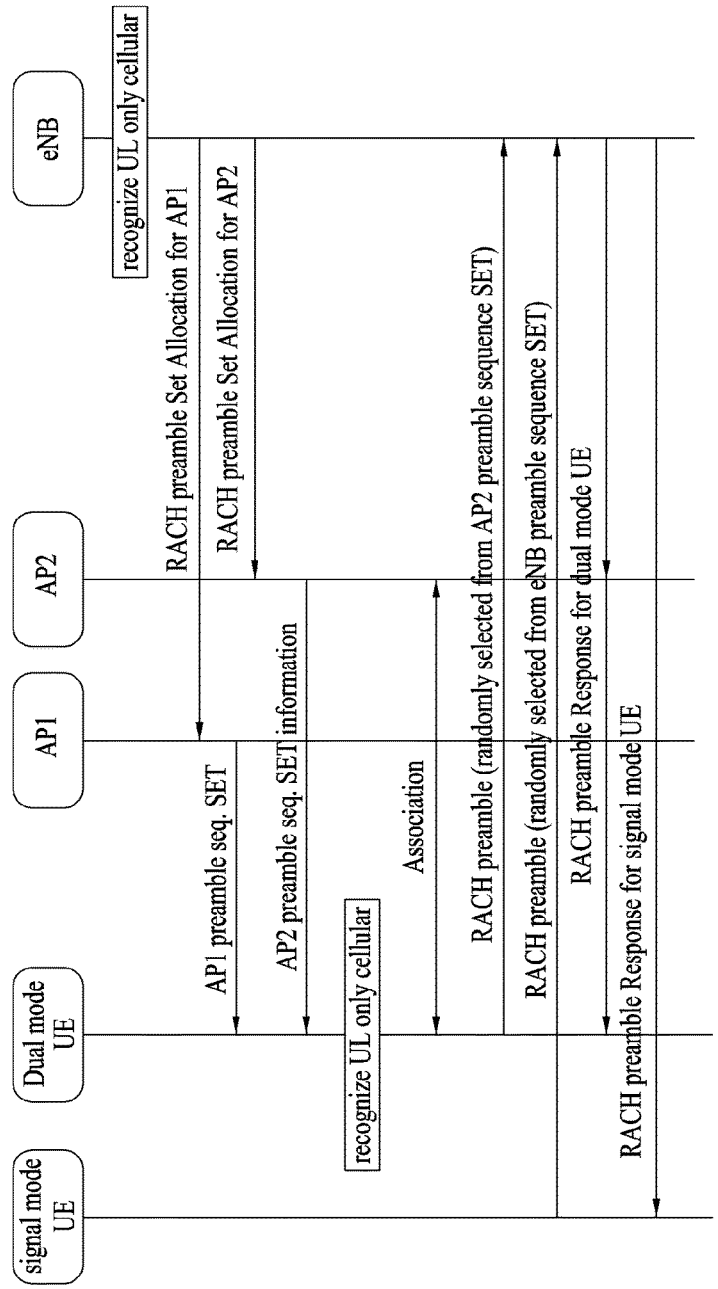
FIG. 12 is an exemplary diagram for an initial attachment procedure which is proposed for a case that a UE is unable to receive cellular DL in a scenario that the UE is located at an area where cellular UL transmission is available only according to a different embodiment of the present invention.

FIG. 12 is an exemplary diagram for an initial attachment procedure which is proposed for a case that a UE is unable to receive cellular DL in a scenario that the UE is located at an area where cellular UL transmission is available only according to a different embodiment of the present invention.

A RACH preamble sequence belonging to a RACH preamble set which is proposed by the technology of the present invention can be configured by a value distinguished from a RACH preamble sequence received by an eNB from a UE identically operating in a cell of the eNB. And, in order to distinguish APs from each other supporting DL of a cellular network controlled by an identical eNB (or a cellular network to which a RACH preamble set is allocated), a corresponding AP RACH preamble set may have a different set between APs. In particular, having received the RACH preamble sequence from the UE, the eNB can determine an AP or a cellular link for transmitting a RACH preamble response message to the UE via the RACH preamble sequence.

And, the RACH preamble sequence set proposed by the present invention can also be used for determining a parameter of a RACH preamble response (Msg 2).

Referring to FIG. 12, an eNB can recognize that a dual-mode UE and a single-mode UE are able to perform cellular UL transmission only or the dual-mode UE and the single-mode UE are located at an area where cellular UL transmission is available only. And, the eNB transmits RACH preamble sequence set allocation information for an AP 1 to the AP 1 and transmits RACH preamble sequence set allocation information for an AP 2 to the AP 2. The AP 1 and the AP 2 respectively transmit the RACH preamble sequence set allocation information received from the eNB to the dual-mode UE. In this case, the dual-mode UE, which has recognized that the dual-mode UE is able to perform cellular UL transmission only or the dual-mode UE is located at an area where cellular UL transmission is available only, establishes an association with the AP 2. The dual-mode UE transmits a RACH preamble sequence randomly selected from the RACH preamble sequence set allocation information received from the AP 2 to the eNB. Meanwhile, since the single-mode UE did not receive the RACH preamble sequence set allocation information from the AP 1, the single-mode UE transmits a RACH preamble sequence randomly selected from a preamble sequence set of the eNB to the eNB.

The eNB checks the RACH preamble sequence received from the dual-mode UE and transmits a RACH preamble response to the dual-mode UE via an AP. Meanwhile, the eNB checks the RACH preamble sequence received from the single-mode UE and directly transmits a RACH preamble response to the single-mode UE.

(2) Random Access Response Window Size when Cellular DL Reception is Available Only or Cellular UL Transmission is Available Only According to the related art, an eNB transmits ra-ResponseWindowSize of a RACH configuration common SIB of Radio Resource configuration Common information of SIB2 to a UE. The corresponding parameter is used for monitoring an RSP message transmitted by an RA-RNTI, which is transmitted by the UE during 3+ra-ResponseWindowSize subframe to receive a RACH preamble response message from the eNB, after the UE transmits a RACH preamble sequence.

For contents on the ra-ResponseWindowSize, it may refer to Table 2 in the following.

TABLE 2

Duration of the RA response window in TS 36.321 [6]. Value in subframes. Value sf2 corresponds to 2 subframes, sf3 corresponds to 3 subframes and so on. The same value applies for each serving cell (although the associated functionality is performed independently for each cell).

Unlike a legacy method of directly transmitting a RACH message 1 and receiving a message 2 via a cellular link, since a dual-mode UE transmits a message 1 or receives a message 2 via an AP in a scenario that cellular UL transmission is available only or DL reception is available only, time (response delay) taken for receiving the message 2 may be longer than time taken for receiving the message 2 by the legacy method. For this reason, if the message 2 is monitored using a parameter value identical to a legacy parameter value, it may become a factor of increasing an error in an initial attachment procedure. In order to solve the problem, when the dual-mode UE operates in the scenario that cellular UL transmission is available only or DL reception is available only, the present invention proposes to newly configure ra-ResponseWindowSize for the dual-mode UE.

When cellular DL reception is available only, it is able to define a subframe for monitoring a response message via a cellular link in response to a first message (preamble sequence/msg1 or RRC connection request/msg3) transmitted via an AP. When cellular UL transmission is available only, it may be able to define a time unit (e.g., slot time) for monitoring a response message via a Wi-Fi link in response to a preamble sequence (msg1) transmitted via cellular.

Figure 13:
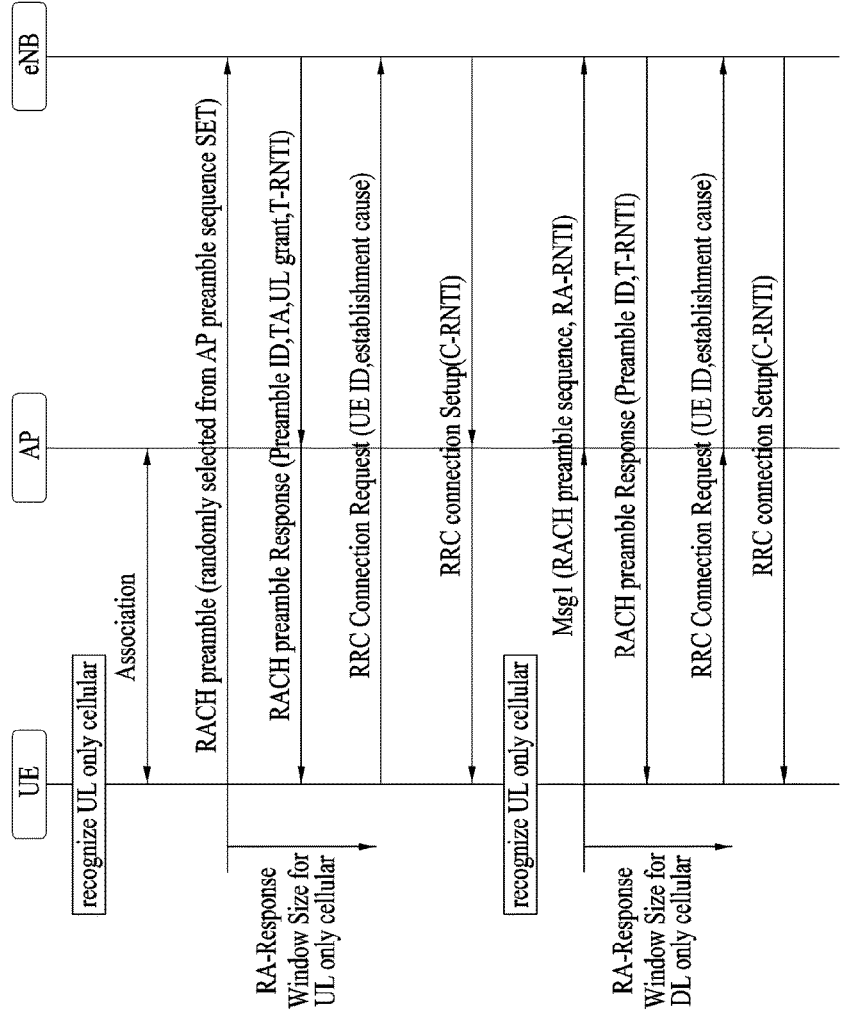
FIG. 13 is an exemplary diagram for an initial attachment procedure to which a random access response window size which is proposed according to embodiment of the present invention is applied.

FIG. 13 is an exemplary diagram for an initial attachment procedure to which a random access response window size which is proposed according to embodiment of the present invention is applied.

A parameter for a random access response window size, which is applicable to a scenario that cellular DL reception is available only or cellular UL transmission is available only, can be transmitted to a dual-mode UE by an eNB via SIB 2. If the parameter is transmitted as information for the dual-mode UE, the parameter can also be transmitted via corresponding SIB for the dual-mode UE. If the parameter for the random access response window size is transmitted as a broadcast message, the dual-mode UE can receive the parameter before an initial attachment procedure is performed.

Referring to FIG. 13, if a UE is able to transmit cellular UL only or the UE recognizes that the UE is located at an area where cellular UL transmission is available only, the UE establishes an association with an AP. And, as mentioned earlier in the previous embodiments, the UE transmits a RACH preamble sequence randomly selected from the received AP preamble sequence set to an eNB. The eNB transmits a RACH preamble response message including a preamble ID, a TA, a UL grant and a TA-RNTI to the UE in a manner of passing through the AP. The UE transmits an RRC connection request message including a UE ID and an establishment cause to the eNB and the eNB transmits an RRC connection setup message including an allocated C-RNTI to the UE. In this case, when the cellular UL transmission is available only, a random access response window size becomes greater than time taken for directly transmitting a RACH preamble sequence and receiving a response message between a legacy eNB and a UE.

Meanwhile, if a UE is able to receive cellular DL only or the UE recognizes that the UE is located at an area where cellular DL reception is available only, the UE transmits Msg 1 including a RACH preamble sequence and an RA-RNTI to an eNB via an AP. The UE can directly receive a RACH preamble response message (Msg 2) including a preamble ID, a TA, a UL grant and a T-RNTI from the eNB in response to the Msg 1. In this case, in a scenario that cellular DL reception is available only, a random access response window size becomes greater than time taken for directly transmitting a RACH preamble sequence and receiving a response message between a legacy eNB and a UE.

(3) RACH Procedure in Scenario that Cellular UL Transmission is Available Only

Figure 14:
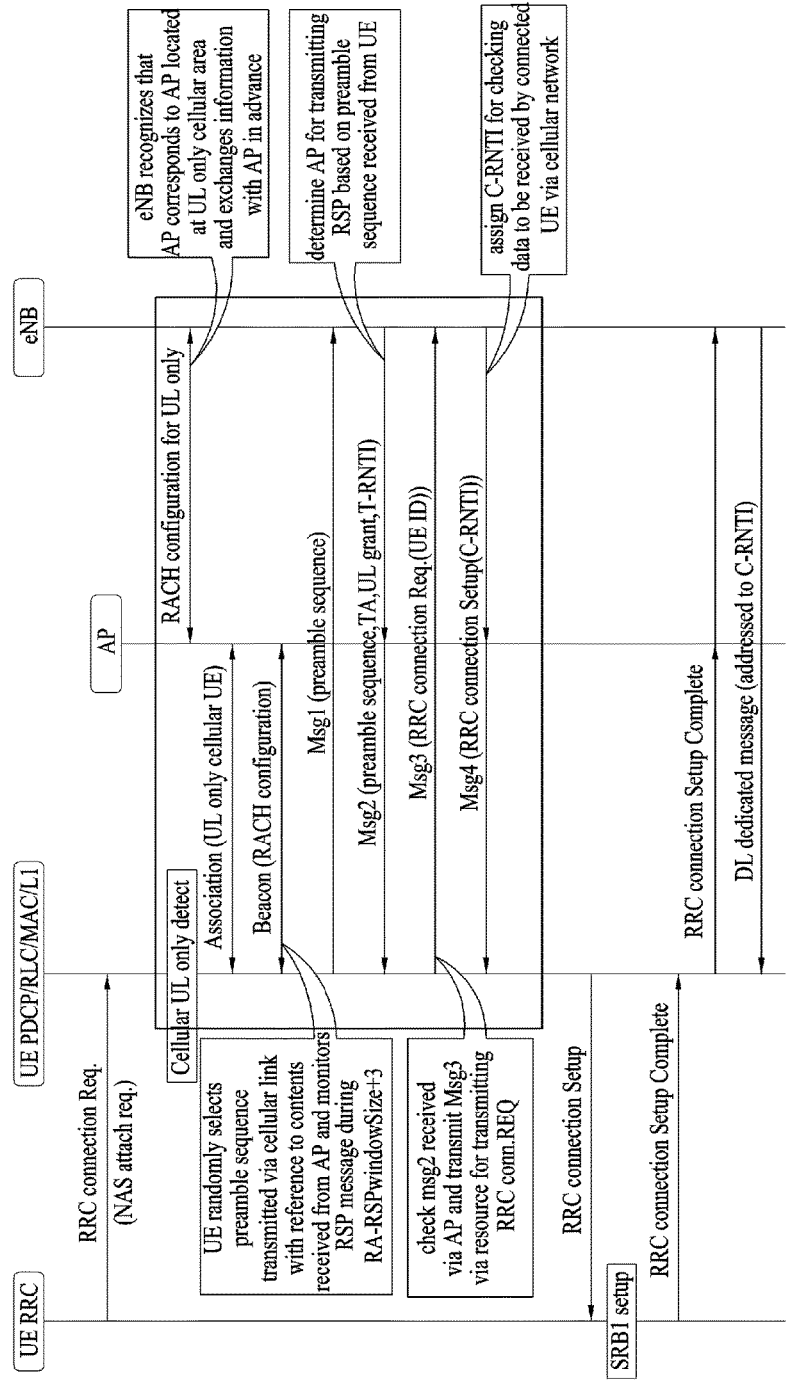
FIG. 14 is an exemplary diagram for explaining a RACH procedure in case of allocating a RACH preamble set and applying a random access response window size proposed by the present invention in a scenario that cellular UL transmission is available only.

FIG. 14 is an exemplary diagram for explaining a RACH procedure in case of allocating a RACH preamble set and applying a random access response window size proposed by the present invention in a scenario that cellular UL transmission is available only.

Referring to FIG. 14, it is able to recognize that cellular UL transmission is available only in a UE PDCP/RLC/MAC/L1 layer. The UE PDCP/RLC/MAC/L1 layer establishes an association with an AP and may be then able to receive a beacon signal including RACH configuration information from the AP. An eNB recognizes that the AP corresponds to an AP located at an area where cellular UL transmission of the UE is available only and may be able to exchange information with the AP in advance. The UE PDCP/RLC/MAC/L1 layer randomly selects a RACH preamble sequence to be transmitted via a cellular UL link based on the RACH configuration information received from the AP and transmits the selected RACH preamble sequence to the eNB. The eNB checks the RACH preamble sequence received from the UE and may be then able to determine an AP for transmitting a RACH preamble response message (Msg 2). The eNB transmits a RACH preamble response message (Msg 2)including a preamble sequence, a TA, a UL grant and a T-RNTI using the determined AP. The AP delivers the Msg 2 to the UE.

The UE PDCP/RLC/MAC/L1 layer monitors the RACH preamble response message during RA-RSPwindowSize+3. Having received the Msg 2, the UE transmits an RRC connection request message (Msg 3)including a UE ID to the eNB via a resource indicated by the UL grant. The eNB allocates a C-RNTI (cell-RNTI) to make a connected UE check data to be received via a cellular network. In this case, the C-RNTI may correspond to the aforementioned T-RNTI (temporary C-RNTI).

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of performing a random access procedure, which is performed by a user equipment in a network in which a plurality of communication systems interwork can be industrially used in a wireless communication system such as 3GPP LTE-A and the like.

What is claimed is:

1. A method for performing a random access procedure by a user equipment (UE) which can access to a cellular communication system and a wireless LAN at same time in a network in which a plurality of communication systems interwork, the method comprising:

establishing a connection with an access point (AP) of the wireless LAN communication system when the UE locates at a specific area, wherein the specific area is where a direct uplink transmission to the cellular communication system is impossible and a direct downlink transmission from the cellular communication system is possible for the UE;

transmitting, to an eNodeB (eNB), a first message including a random access preamble sequence;

receiving, from the eNB, a second message including a random access response (RAR) related to the random access preamble and an uplink grant for the AP;

transmitting, to the eNB, a third message including the uplink grant and a radio resource control (RRC) connection request; and receiving, from the eNB, a fourth message related to a RRC connection setup in response to the third message, wherein the first and the third message are relayed by the AP of the wireless LAN communication system for transmitting to the eNB, and the second and the fourth message are received directly via the cellular communication system;

wherein a first RAR window size is configured when the UE locates at the specific area; and wherein the first RAR window size is greater than a RAR window size configured when both of the direct uplink and downlink transmissions between the UE and the eNB are performed.

2. The method of claim 1, wherein the second message comprises a temporary cell-radio network temporary identifier (C-RNTI), and wherein the uplink grant comprises information of an uplink resource for the AP.

3. The method of claim 1, wherein the fourth message comprises a cell-radio network temporary identifier (C-RNTI) assigned for the UE, the method further comprising receiving data from the eNB based on the C-RNTI after receiving the fourth message.

4. A user equipment (UE) for performing a random access procedure in a network in which a plurality of communication systems interwork, the UE capable of accessing a cellular communication system and a wireless LAN at the same time, the UE comprising:

a transmitter configured to transmit information;

a receiver configured to receive information;

a processor for connected to the receiver and the transmitter, and configured to:

establish a connection with an access point (AP) of the wireless LAN communication system when the UE locates at a specific area, wherein the specific area is where a direct uplink transmission to the cellular communication system is impossible and a direct downlink transmission from the cellular communication system is possible for the UE;

control the transmitter to transmit, to an eNodeB (eNB), a first message including a random access preamble sequence;

control the receiver to receive, from the eNodeB, a second message including a random access response (RAR) related to the random access preamble and an uplink grant for the AP, control the transmitter to transmit, to the eNB, a third message including the uplink grant and a radio resource control (RRC) connection request; and control the receiver to receive, from the eNB, a fourth message related to a RRC connection setup in response to the third message, wherein the first and the third message are relayed by the AP of the wireless LAN communication system for transmitting to the eNB, and the second and the fourth message are received directly via the cellular communication system, wherein a first RAR window size is configured when the UE locates at the specific area; and wherein the first RAR window size is greater than a RAR window size configured when both of the direct uplink and downlink transmissions between the UE and the eNB are performed.

5. The UE of claim 4, wherein the second message comprises a temporary cell-radio network temporary identifier (C-RNTI), and wherein the uplink grant comprises information of an uplink resource for the AP.

6. The UE of claim 4, wherein the fourth message comprises a cell-radio network temporary identifier (C-RNTI) assigned for the UE and wherein the receiver is configured to receive data from the eNB based on the C-RNTI after receiving the fourth message.

* * * * *